July 12, 1966  J. RAY ETAL  3,260,058
METHOD AND APPARATUS FOR SEPARATING GASEOUS
MIXTURES, PARTICULARLY HELIUM-CONTAINING
GASES
Filed May 9, 1962  4 Sheets-Sheet 1

INVENTORS
JOSEPH RAY
LEE S. GAUMER, JR.
BY
ATTORNEYS

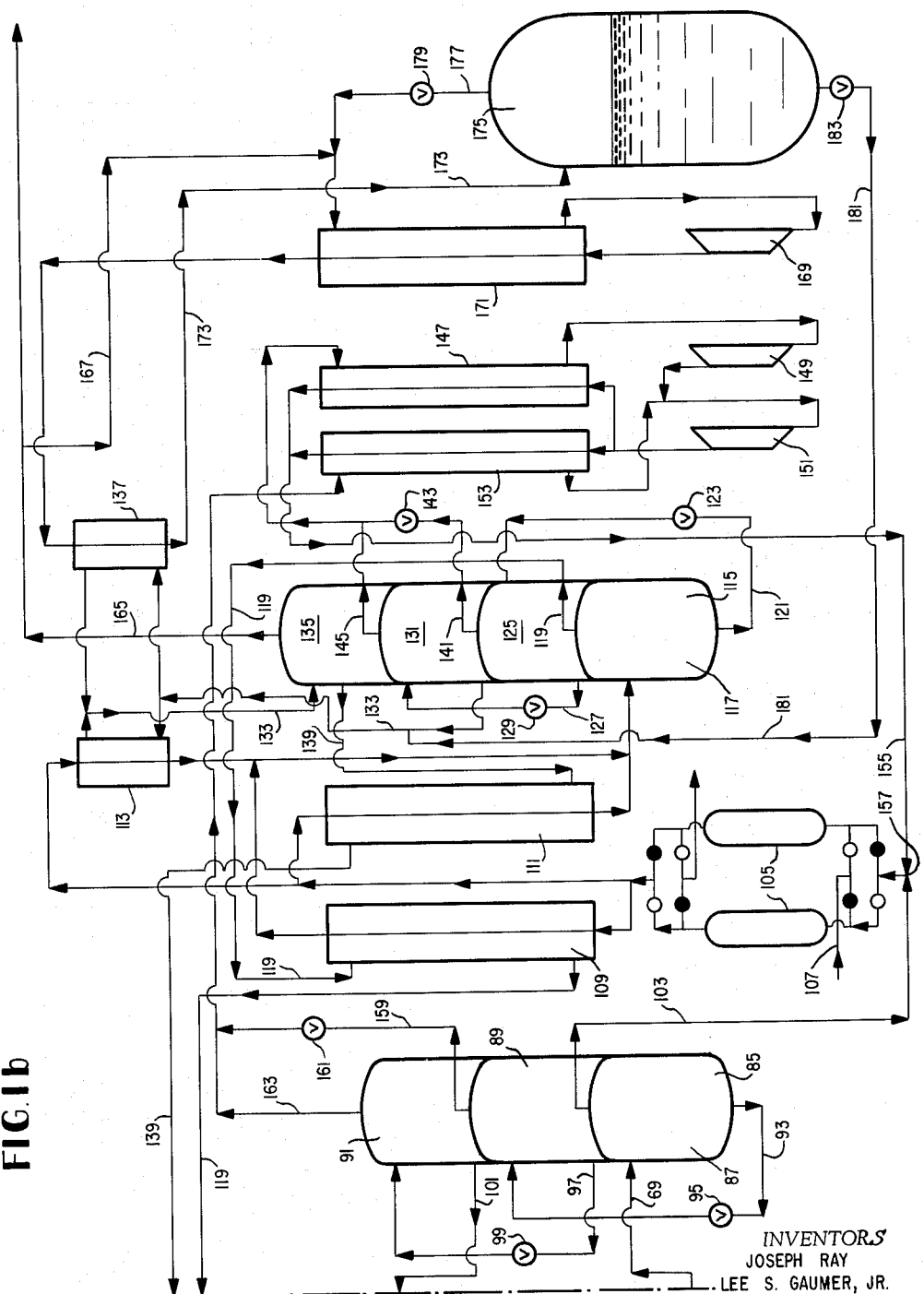

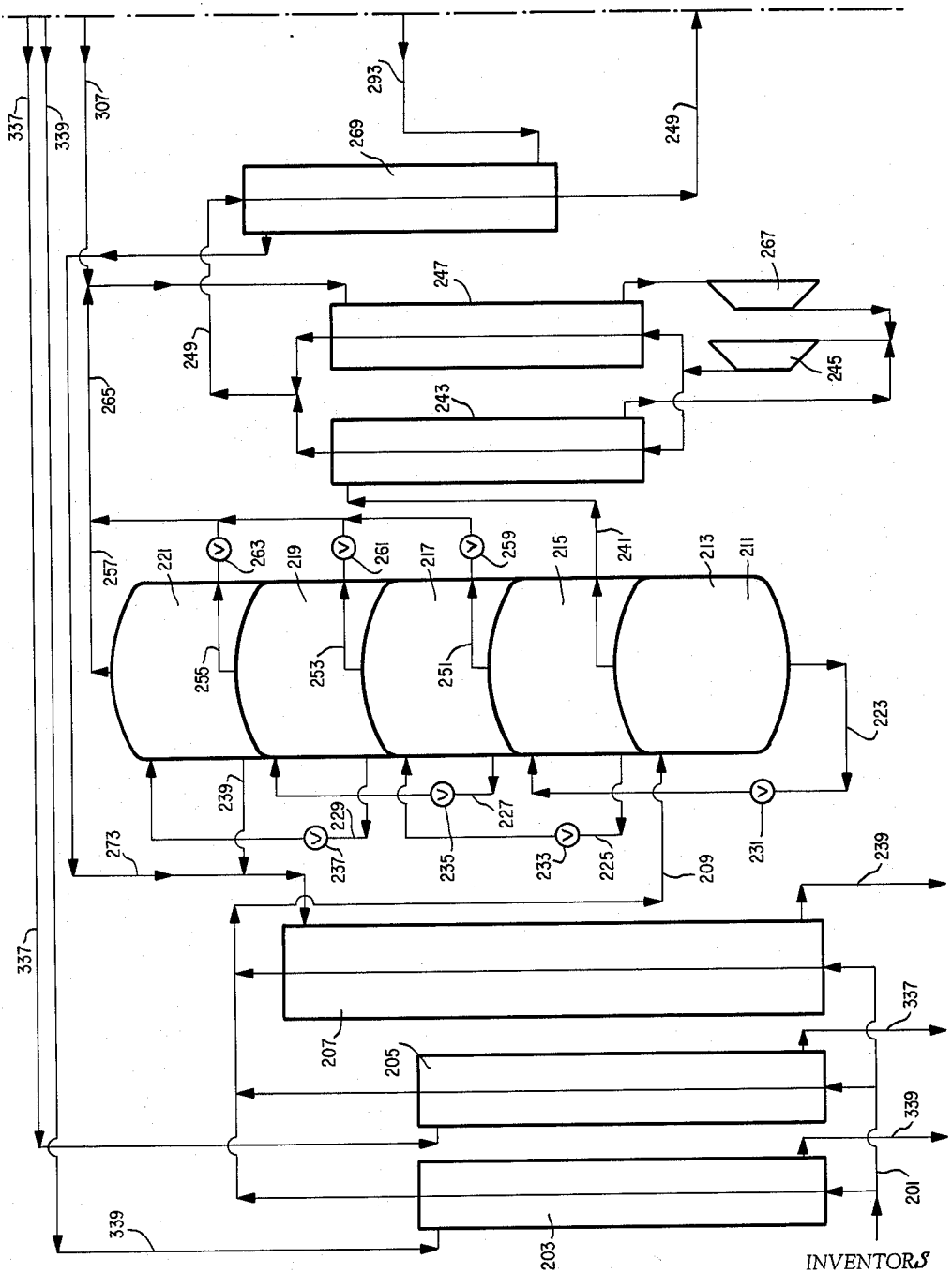

July 12, 1966
J. RAY ETAL
3,260,058
METHOD AND APPARATUS FOR SEPARATING GASEOUS
MIXTURES, PARTICULARLY HELIUM-CONTAINING
GASES
Filed May 9, 1962
4 Sheets-Sheet 4
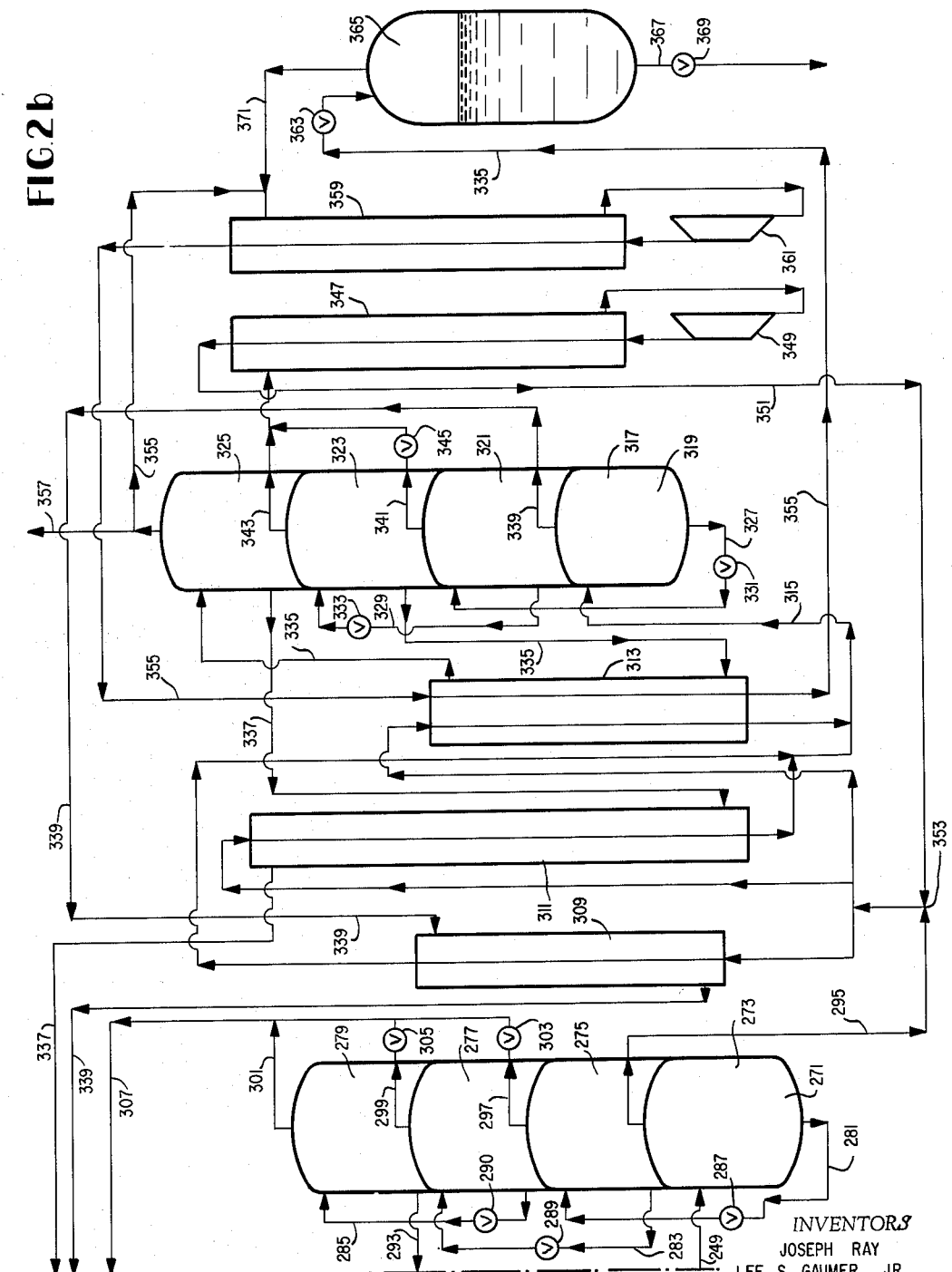
FIG.2b
INVENTORS
JOSEPH RAY
LEE S. GAUMER, JR.
BY 
ATTORNEYS

United States Patent Office 3,260,058
Patented July 12, 1966

3,260,058
METHOD AND APPARATUS FOR SEPARATING GASEOUS MIXTURES, PARTICULARLY HELIUM-CONTAINING GASES
Joseph Ray, Emmaus, and Lee S. Gaumer, Jr., Allentown, Pa., assignors to Air Products and Chemicals, Inc., a corporation of Delaware
Filed May 9, 1962, Ser. No. 193,463
20 Claims. (Cl. 62—23)

The present invention relates to methods and apparatus for separating gaseous mixtures, more particularly by low temperature techniques so as selectively to cause partial liquefaction of the mixtures.

It is an object of the present invention to provide methods for separating gaseous mixtures which will assure maximum recovery of at least one desired component.

Another object of the present invention is the provision of methods for separating gaseous mixtures, characterized by minimum power consumption.

Still another object of the present invention is the provision of methods for efficiently separating carbon dioxide from natural gas.

A further object of the present invention is the provision of apparatus for separating gaseous mixtures which will be relatively inexpensive to manufacture, install, operate, maintain and repair.

Finally, it is an object of the present invention to provide methods adapted to be practiced by the use of such inexpensive apparatus.

Other objects and advantages of the present invention will become apparent from a consideration of the following description, taken in connection with the accompanying drawings, in which:

FIGURE 1b is the other portion of the diagrammatic showing of FIGURE 1a;

FIGURE 2a is a portion of a diagrammatic view of another embodiment of a gas separation cycle according to the present invention; and FIGURE 2b is the other portion of the diagrammatic showing of FIGURE 2a.

Figure 1A:
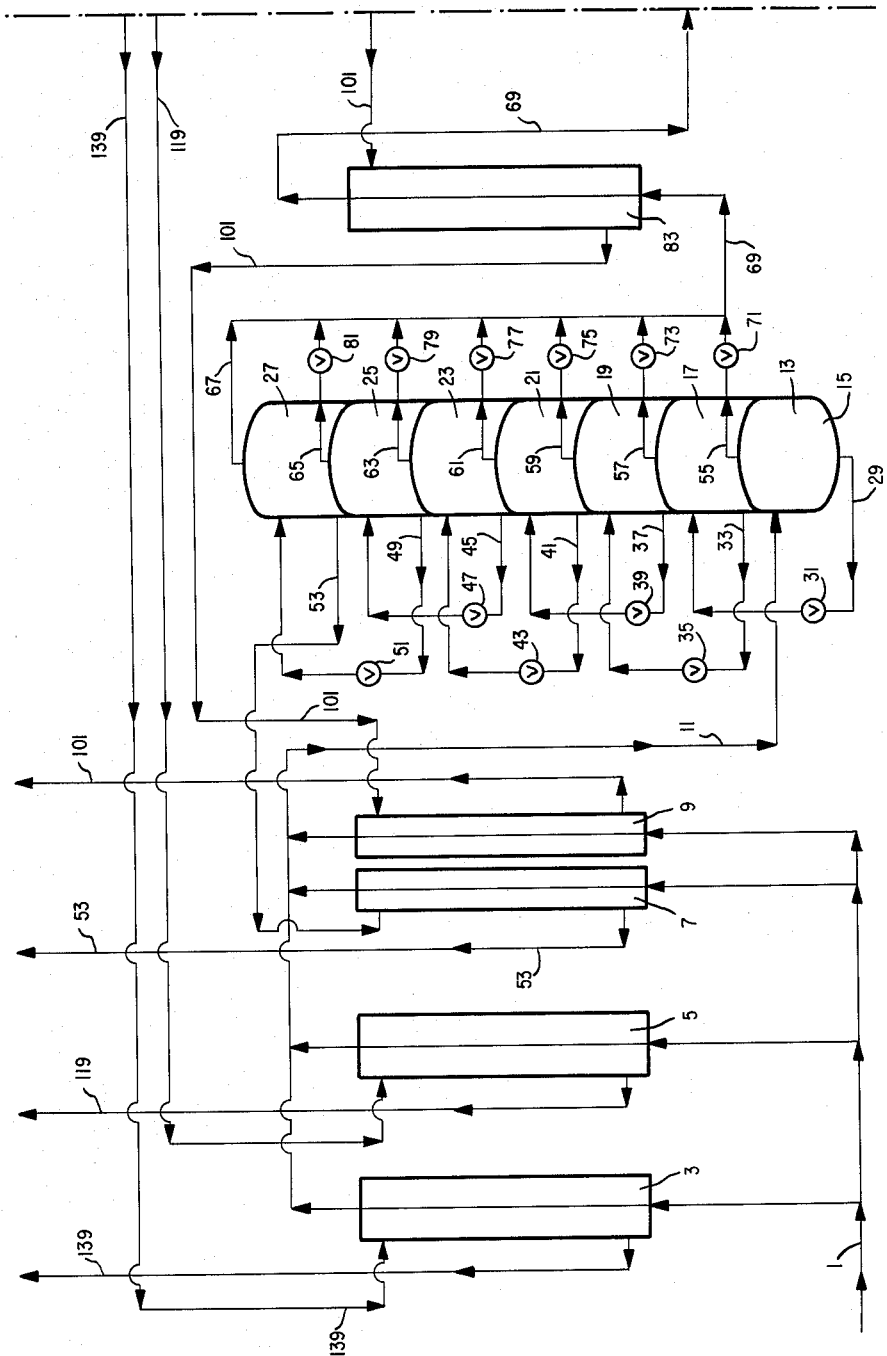
FIGURE 1a is a portion of a diagrammatic view of one embodiment of a gas separation cycle according to the present invention.

The invention will be described and illustrated in connection with cycles for separating the components of natural gas so as to obtain streams of fuel gas and residue gas and a stream of crude helium. It is to be understood, however, that the invention is applicable to the separation of a number of other gaseous mixtures.

The cycles of FIGURES 1a and 1b will be considered first. For purposes of illustration, let it be assumed that the natural gas entering the cycle of FIGURES 1a and 1b has an analysis in mole percents as follows:

| | |
|---|---|
| Helium | 0.40 |
| Nitrogen | 14.23 |
| Methane | 78.70 |
| Ethane | 6.33 |
| Propane | 0.28 |
| Carbon dioxide | 0.06 |

This gas enters the cycle through conduit 1 at a pressure of 530 p.s.i.a. and a temperature of $-31°$ F. It is divided into four streams and passes through four countercurrent heat exchangers 3, 5, 7 and 9 in parallel, in which the feed is cooled against exiting products, the recombined feed stream passing through conduit 11 being thus reduced in temperature to $-156.5°$ F. and having a pressure of 510 p.s.i.a., at which temperature and pressure it is partly in liquid and partly in vapor phase.

The cooled and partially condensed natural gas in conduit 11 then proceeds to a first flash column 13 made up as a series of drums 15, 17, 19, 21, 23, 25 and 27 that are stacked atop each other so that adjacent drums have a common top and bottom wall. This arrangement of the drums in the flash column is preferred for the economy that results from such unified construction. It will of course be understood that it is functionally equivalent to separate the drums from each other, as the heat exchange between adjacent drums through the common walls is negligible.

The material in conduit 11 is introduced into the highest pressure stage, that is, into drum 15, which serves as a phase separator for the liquid and vapor components of the partially condensed natural gas. The liquid thus separated by gravity from the vapor is removed from drum 15 through conduit 29 and passes through an expansion valve 31 in which a quantity of vapor is flashed from the liquid. The resulting mixed vapor and liquid is then introduced into the next lower pressure stage, drum 17, where it is phase separated by gravity; and the liquid thus collected in drum 17 is withdrawn through conduit 33 in which a further quantity of vapor is flashed off through an expansion valve 35. This latter mixed vapor and liquid is fed to drum 19, in which it is phase separated by gravity, and the liquid is withdrawn through conduit 37 past expansion valve 39, and so on up the column to drums 21, 23, 25 and 27 through conduit 41 and expansion valve 43, conduit 45 and expansion valve 47, and finally conduit 49 and expansion valve 51.

The liquid which finally collects in lowest pressure drum 27 comprises 81.5% of the feed, and is withdrawn through conduit 53 at a pressure of 410 p.s.i.a. at a temperature of $-165°$ F., and has the following mole percent composition:

| | |
|---|---|
| Nitrogen | 10.0 |
| Methane | 82.0 |
| Ethane | 7.6 |
| Propane | 0.3 |
| Carbon dioxide | 0.1 |

The carbon dioxide that leaves through conduit 53 is 93% of the original carbon dioxide.

The material in stream 53 is exchanged against 89.1% of the initial feed in exchanger 7 and leaves the system as residue gas entirely in vapor phase at $-43.9°$ F. and 370 p.s.i.a.

Apart from the quantity of vapor separated from liquid in highest pressure drum 15, it is preferable that the quantity of vapor separated in each of the succeeding drums of flash column 13 be aproximately equal, that is, for the six lower pressure drums, one-sixth of the total vapor that is in addition to the vapor separated in drum 15 should be separated in each of the succeeding drums. The desirability of keeping the quantity of vapor separated in each of drums 17–27 about equal to that separated in any other drum of the set of drums means that the pressure drop from drum to drum of column 13 will be about constant. If for example 8.1% of the initial feed to the flash column is vapor, then of course 8.1% of the initial feed will be removed as vapor from drum 15. The subsequently flashed-off vapor, for example a total of 10.3% of the initial feed, is evenly divided among drums 17–27 so that about 1.72% of the initial feed is withdrawn in vapor phase from each such drum. Thus, of the total vapor that leaves flash column 13, about 44% is never condensed, while the balance has been flashed off stepwise in equal increments. The pressure drops between the drums will be about equal. The pressure of drum 15, for example, is 510 p.s.i.a., while that of drum 17 is 493.3 p.s.i.a., drum 19 476.6 p.s.i.a., drum 21 460 p.s.i.a., drum 23 443.3 p.s.i.a., drum 25 426.7 p.s.i.a., and drum 27 410 p.s.i.a.

The overhead from drums 15–27 is withdrawn through conduits 55–67, respectively, and is merged in a common conduit 69. Conduits 55–65, which pass all but the lowest pressure vapor from the flash column, are provided with expansion valves 71–81, respectively, so that the overhead from each of the higher pressure drums of flash column 13 may be reduced to a common pressure, namely, the pressure of drum 27, or 410 p.s.i.a. These merged streams in conduit 69 have a temperature of −166° F. and an approximate mole percent composition as follows:

| | |
|---|---|
| Helium | 2.1 |
| Nitrogen | 32.9 |
| Methane | 64.4 |
| Ethane | 0.6 |

The stream in conduit 69 comprises about 18.5% of the entering gas, the remainder having left through conduit 53.

The material in conduit 69 then passes through a countercurrent heat exchanger 83 where it is cooled and partially liquefied in heat exchange with exiting product to a temperature of −224° F. and a pressure of 400 p.s.i.a.

Leaving FIGURE 1a and moving on to FIGURE 1b, the mixture in conduit 69, partly in liquid and partly in vapor phase, in introduced into a second flash column 85, into the high pressure drum 87 thereof. Column 85 also includes lower pressure drums 89 and 91. Liquid separated by gravity in drum 87 is withdrawn through conduit 93 and flashed in expansion valve 95 from a pressure of 400 p.s.i.a. to a pressure of 215 p.s.i.a., the resulting mixed liquid and vapor being introduced into drum 89. Liquid separated by gravity in drum 89 is withdrawn through conduit 97 and a vapor is flashed off in expansion valve 99, the mixed liquid and vapor being introduced into drum 91 at a pressure of 190 p.s.i.a. Second flash column 85 illustrates the manner in which the interstage pressure drop can be varied in an effort to keep the quantity of vapor flashed off in each expansion valve about constant. It will be noted that the pressure drop from drum 87 to drum 89 is 185 p.s.i., while the pressure drop from drum 89 to drum 91 is only 25 p.s.i. The reason that the pressure drop is so unequal for equal amounts of vapor in lines 159 and 163 is that the helium concentration in line 103 is about 30%. To achieve this high helium concentration, the liquid in conduit 93 had to be cooled drastically. Thus the liquid in conduit 93 behaves as if it were subcooled, even though the liquid is at its bubble point, having been separated from an equilibrium vapor phase.

In contrast, the vapor in line 55 contains only about 3% helium, so that the liquid in line 29 does not act like a subcooled liquid, and about equal amounts of vapor would be produced for equal pressure drop between stages.

Liquid separated by gravity in drum 91 is withdrawn through conduit 101 and used in exchangers 83 and 9 for cooling incoming mixture. This material leaves the cycle through conduit 101 as fuel gas at a temperature of −44° F. and a pressure of 160 p.s.i.a., and a mole percent composition as follows:

| | |
|---|---|
| Nitrogen | 27.7 |
| Methane | 71.6 |
| Propane | 0.7 |

This material is 15.8% of the original feed gas.

At this point it is useful to describe the relationship between flash columns 85 and 13. Flash column 85 produces a more concentrated helium product than flash column 13. The pressure in the highest pressure stage of flash column 85, in drum 87, is a few pounds lower than the pressure in the lowest pressure stage of flash column 13, in drum 27. The pressure difference between drums 27 and 87 is that due to line losses in conduits 67 and 69 and to pressure drop in exchanger 83. Usually this pressure drop will be of the order of 5 to 10 p.s.i.

The amount of pressure letdown on the liquid in the first separator (drum 87 in column 85 and drum 15 in column 13) governs the amount of vapor produced. This amount of vapor should be minimized on the one hand, because it increases the size of the succeeding columns and equipment that handles it, and on the other hand should be maximized to improve helium recovery. Thus an economic balance will dictate the quantity of vapor to be flashd off the first separated liquid.

By this point in the cycle, by far the greatest part of the mixture has been returned in countercurrent heat exchange with the feed as fuel gas or residue gas. In fact, the streams that proceed to the right of second flash column 85 in FIGURE 1b together make up only 2.6% of the feed. It is in this tiny portion of the feed, however, that substantially all of the helium is concentrated. Of all the helium initially present, only about 2% has been lost, 56% of the lost helium passing out through conduit 53 and the remainder through conduit 101.

The gaseous overhead from high pressure drum 87 of second flash column 85 is withdrawn through a conduit 103 and passes through one of a pair of switching carbon dioxide adsorbers 105, while the other or offstream adsorber is being purged with a warm gas introduced through a conduit 107. From adsorber 105, the gaseous material is divided and passes through heat exchangers 109, 111 and 113 in parallel, where it is cooled and partially liquefied against cold crude helium and fuel gas streams. As it leaves drum 87, the stream in conduit 103 has a temperature of −224° F. and a pressure of 400 p.s.i.a. It is comprised of 30.6% helium, 52.0% nitrogen, and 17.4% methane. It leaves exchangers 109, 111 and 113 partly in liquid phase at a temperature of −282° F. and a pressure of 390 p.s.i.a. and enters a third flash column 115 in high pressure drum 117 thereof, where it is separated by gravity into its liquid and vapor components.

The vapor overhead from high pressure drum 117 is the crude helium product of the process and leaves through conduit 119 at a temperature of −282° F. and a pressure of 390 p.s.i.a. It contains 71.7% helium, 27.6% nitrogen, and 0.7% methane. This stream constitutes only 0.55% of the initial feed. It contains, however, 97.9% of the helium in the initial feed. After heat exchange with incoming feed in exchangers 109 and 5, the crude helium product leaves the cycle at a pressure of 370 p.s.i.a. and a temperature of −45° F.

The liquid from high pressure drum 117 is withdrawn through conduit 121 and is flashed through an expansion valve 123 to a pressure of 70 p.s.i.a. and is introduced into the next lower pressure stage 125 of the third flash column 115. The liquid in 125, in turn, is removed through conduit 127 and is flashed through valve 129 to a pressure of 60 p.s.i.a. and is introduced into the next lower pressure stage 131 of column 115.

The liquid from drum 131 is withdrawn through conduit 133 past a control valve 134 and is ultimately delivered to the lowest pressure drum 135 of column 115; but instead of being partially vaporized by flashing through an expansion valve, a vapor is flashed from the liquid by warming this liquid against incoming feed in exchanger 113 and against a portion of the overhead from drum 135 in exchanger 137, so that the difference in pressure between drums 131 and 135 is simply the pressure drop through conduit 133, valve 134 and exchanger 113.

The liquid collecting in flash drum 135 is removed through conduit 139 at −290° F. and 55 p.s.i.a. This liquid constitutes only 2.0% of the initial feed and contains only 0.02% of the initial helium. It is about 73% nitrogen and 27% methane. It passes through heat exchanger 111 and thence through heat exchanger 3, in each of which it cools at least a portion of the gaseous mixture to be separated, and leaves the cycle as fuel gas at −70° F. and 35 p.s.i.a.

The overhead from flash drum 125 is withdrawn through conduit 141 and expanded through valve 143 to a pressure of 60 p.s.i.a., and is merged with the overhead from flash drum 131 which has been withdrawn through conduit 145. This merged stream of overhead from flash drums 125 and 131 then has a pressure of 60 p.s.i.a. and a temperature of −290.6° F., and constitutes only 0.13% of the initial feed. It contains 11% helium, however, the balance being mostly nitrogen. Moreover, the helium in this stream is 3.9% of the initial helium, and is therefore well worth recovering. Accordingly, this merged stream is fed to heat exchanger 147 and thence to a low pressure stage 149 and then a high pressure stage 151 of a compressor in the stages of which it is compressed to 410 p.s.i.a. It is then cooled in heat exchange with itself in exchanger 147 and with another cold stream in parallel in exchanger 153 and is returned through a conduit 155 to a point of recycle 157, where it joins the stream in conduit 103 upstream of adsorbers 105.

But the biggest helium economy is effected by the special treatment of the overhead drums 89 and 91 of second flash column 85. Overhead from drum 89 is withdrawn through conduit 159 and expanded in expansion valve 161 to 190 p.s.i.a., which is also the pressure of the overhead from drum 91 withdrawn through conduit 163. The overheads from drums 89 and 91 are then merged into a stream which is at a pressure of 190 p.s.i.a. and a temperature of −232.2° F. This stream constitutes only 1.6% of the total feed, but it includes 18.6% of the initial helium and must be treated for helium recovery in order to achieve reasonable efficiency of the cycle. In terms of mole percents, this merged stream is 4.7% helium, 72.5% nitrogen, and 22.8% methane. It passes through exchanger 153 and then joins the partially compressed output of stage 149 on its way to high pressure stage 151 of the compressor, as its pressure is 180 p.s.i.a., which is considerably above the pressure of the overhead from the latter stages of third flash column 115.

The combined and recompressed overheads from the latter stages of second and third flash columns 85 and 115, after heat exchange against themselves in exchangers 147 and 153, have a temperature of −200° F. and a pressure of 400 p.s.i.a., the same pressure as in conduit 103. This recompressed combined stream in conduit 155 totals 1.7% of the feed and contains 22.3% of the original helium. In terms of mole percents, it contains 5.2% helium, 73.6% nitrogen, and 21.2% methane.

The overhead from lowest pressure drum 135 of the third flash column 115 is withdrawn through conduit 165, and a major proportion is withdrawn for use as purge gas at −290° F. and 55 p.s.i.a. A small portion of the overhead from drum 135 is passed through a conduit 167 on its way to a compressor 169 in which its pressure is raised from 35 p.s.i.a. to 135 p.s.i.a. It is heat exchanged against itself in an exchanger 171 and is cooled further in exchanger 137 to the point that it is entirely in liquid phase. This stream, which is about 98.5% nitrogen and 1.5% methane, passes a control valve 172 and is introduced through a conduit 173 almost entirely in liquid phase into a storage tank 175. The vapors from this tank are withdrawn through a conduit 177 controlled by a valve 179 and introduced into exchanger 171 along with material from conduit 167. Liquid may be withdrawn from tank 175 through conduit 181 under the control of a valve 183 and introduced into conduit 133 between drums 131 and 135 of third flash column 115. Thus, liquid from tank 175 may be used to provide refrigeration during start-up, and vapor from tank 175 may be used to purge the system.

A further embodiment of gas separation cycle according to the present invention is shown in FIGURES 2a and 2b. Broadly, this second cycle differs from the first cycle primarily in that the second cycle is initially a low pressure cycle and that it is better adapted than the first cycle for the removal of carbon dioxide without resort to chemical means such as adsorbers.

Natural gas enters the cycle of FIGURES 2a and 2b through a conduit 201 at a pressure of 365 p.s.i.a. and a temperature of −20° F. It may have, for example, the following mole percent composition:

| | |
|---|---|
| Helium | 0.49 |
| Nitrogen | 10.93 |
| Methane | 78.72 |
| Ethane | 5.79 |
| Propane | 2.82 |
| Butane | 0.92 |
| Pentane | 0.17 |
| Carbon dioxide | 0.16 |

This stream is divided into three streams and passed in parallel in countercurrent heat exchange with exiting products in exchangers 203, 205 and 207, and leaves these exchangers and is combined into a single stream that passes partly in vapor phase but mostly in liquid phase through a conduit 209 into a first flash column 211, wherein liquid phase passes successively through drums 213–221 by means of conduits 223–229 and expansion valves 231–237 in which portions of vapor are successively flashed off. As in the preceding embodiment, most of the entering feed leaves in liquid phase from the lowest pressure drum 221 through conduit 239, this material being 84.5% of the feed and having a pressure of 210 p.s.i.a. and a temperature of −190° F. On the basis of moles per 100 moles of initial feed, its composition in moles is as follows:

| | |
|---|---|
| Nitrogen | 5.46 |
| Methane | 69.24 |
| Ethane | 5.76 |
| Propane | 2.82 |
| Butane | 0.92 |
| Pentane | 0.17 |
| Carbon dioxide | 0.16 |

This material then passes in heat exchange through exchanger 207 and leaves the cycle as residue gas at a temperature of −33° F. It should especially be noted that this stream of residue gas contains virtually all the carbon dioxide, specifically, 99.9935% of the original carbon dioxide.

The overhead from high pressure drum 213 leaves through conduit 241 and passes through heat exchanger 243 on its way to a high pressure stage 245 of a compressor, whence it is returned in parallel through exchangers 243 and 247, the streams in these exchangers being recombined into a single stream in conduit 249. The overhead from lower pressure drums 215–221 is withdrawn through conduits 251–257, respectively, and the vapor in conduits 251–255 is expanded through valves 259–263, respectively, to the pressure in conduit 257, that is, 210 p.s.i.a. These four vapor streams are then merged into conduit 265 and fed through exchanger 247 on their way to low pressure stage 267 of the previously-mentioned compressor, where they are compressed from 190 p.s.i.a. to the inlet pressure of high pressure stage 245, that is, 340 p.s.i.a. The combined stream from conduits 241 and 265 leaves high pressure stage 245 at a pressure of 530 p.s.i.a. and passes through conduit 249 to exchanger 269, where it is cooled against exiting product and then passes from the portion of the cycle shown in FIGURE 2a to the portion of the cycle shown in FIGURE 2b.

Resuming then with FIGURE 2b, the cooled and partially condensed material in conduit 249 is fed to a second flash column 271 having drums 273–279, the liquid being fed interstage through conduits 281–285 in which vapor fractions are flashed off in expansion valves 287–290, respectively. The liquid from lowest pressure drum 279 leaves through conduit 293 at a temperature of −228° F. and a pressure of 220 p.s.i.a. and a composition expressed in terms of moles per 100 moles of initial feed to the beginning of the cycle as follows:

Nitrogen _____ 4.62
Methane _____ 9.23
Ethane _____ 0.03

This liquid stream also contains substantially all the remaining carbon dioxide, namely, 0.0027 mole per 100 moles of entering feed. This liquid is warmed in exchanger 269 and the resulting stream is added to the liquid in conduit 239 to become a portion of the residue gas.

The overhead from high pressure drum 273 of second flash column 271 is withdrawn through conduit 295 and contains, on a basis of moles per 100 moles of entering feed, 0.48 mole of helium, 0.84 mole of nitrogen, and 0.25 mole of methane. It also contains only 6.8 parts per million (p.p.m.) carbon dioxide. The overhead from the lower pressure drums 275–279 is also withdrawn through conduits 297–301, respectively, the overhead in conduits 297 and 299 being expanded through valves 303 and 305, respectively, to the pressure of conduit 301, which is 220 p.s.i.a. These three lower pressure overhead vapor streams are then merged into a conduit 307; then instead of moving forward in the cycle, that is, to the right as seen in FIGURE 2b, the material in conduit 307 is recycled and joins the material in conduit 265 to pass through exchangers 247 and low and high pressure compressor stages 267 and 245 to be returned through conduit 249 partly in liquid and partly in vapor phase as feed to high pressure drum 273 of second flash column 271. The material in the combined stream in conduit 307 has a mole composition, based on 100 moles of entering feed, of 0.13 mole helium, 1.75 moles of nitrogen, and 0.55 mole of methane.

The overhead in conduit 295 is divided into three parts and is passed in parallel through three heat exchangers 309, 311 and 313, in which it is cooled and partially condensed by heat exchange with exiting products and other relatively cold materials. The partially condensed material is recombined in conduit 315 and is fed into a third flash column 317 into high pressure drum 319 thereof. Column 317 also includes successively lower pressure drums 321, 323 and 325. Liquid is fed from drum to drum through conduits 327 and 329 in which vapor is flashed off through expansion valves 331 and 333, respectively. The liquid passes from drum 323 to drum 325 past a control valve 334 and through a conduit 335 which carries this liquid through exchanger 313 in heat exchange relationship to the entering material therein. This material undergoes no substantial expansion other than that due to normal pressure drop through conduit 335 and control valve 334 and exchanger 313.

The liquid leaving lowest pressure drum 325 through conduit 337 contains no significant quantity of helium, and on a basis of moles per 100 moles of entering feed, contains 0.56 mole of nitrogen and 0.24 mole of methane, as well as 13.4 parts per million of carbon dioxide, and is at a pressure of 45 p.s.i.a. and a temperature of −292° F. This material is evaporated in exchanger 311 and also fed through exchanger 205 to cool the incoming materials, and leaves the cycle as low pressure gas at a pressure of 30 p.s.i.a. and a temperature of −35° F.

The overhead vapor from high pressure drum 319 of the third flash column 317 is the crude helium product of this embodiment of the cycle of the present invention, and is withdrawn through conduit 339 at a pressure of 490 p.s.i.a. and a temperature of −274° F. On the basis of moles per 100 moles of entering mixture, it contains 0.48 mole helium, 0.21 mole nitrogen, and a little less than 0.01 mole of methane. Percentage-wise, it is 68.7% helium, 30.3% nitrogen, and 1.0% methane. It contains no measurable quantity of carbon dioxide. It is passed through exchangers 309 and 203 in countercurrent heat exchange with the material entering therethrough, and leaves the cycle at a pressure of 480 p.s.i.a. and a temperature of −30° F.

The overhead from lower pressure drums 321 and 323 of third flash column 317 is withdrawn through conduits 341 and 343, respectively, that in conduit 341 being expanded through valve 345 to the pressure in conduit 343, that is, 50 p.s.i.a. This material is heat exchanged against itself in heat exchanger 347 before and after compression in a compressor stage 349 in which its pressure is raised to 500 p.s.i.a. This recompressed material, containing on a mole basis 0.012 mole helium, 0.124 mole nitrogen, and 0.003 mole of methane per 100 moles of entering feed, is then recycled through conduit 351 to a point of recycle 353, at which point it joins the stream of overhead from drum 273 of second flash column 271 in conduit 295 and proceeds thence through exchangers 309, 311 and 313 back to the high pressure drum 319 of third flash column 317.

The overhead from the lowest pressure drum 325 of third flash column 317 is withdrawn through a conduit 357 for use as purge gas for the equipment, and a small quantity may be diverted through conduit 355 as a source of gas for the liquid storage. The material in conduit 355, which is 97.5% nitrogen and 2.5% methane, is heat exchanged against itself in heat exchanger 359 before and after compression from 40 p.s.i.a. to 120 p.s.i.a. in a compressor stage 361, and is fed thence through exchanger 313 where it is cooled and condensed, and is then passed through control valve 363 after which it is introduced into a storage tank 365. The liquid in tank 365 is available for making purge gas during startup by heating the liquid in a vaporizer, or this liquid may be used for cool down of various equipment; and it may be withdrawn for these purposes through conduit 367 by manipulation of a valve 369. The vapor which forms in the dome of tank 365 by evaporation of the body of liquid therein is withdrawn through conduit 371 and recycled in conduit 355 upstream of heat exchanger 359 and compressor stage 361 or may be used to purge the system.

The embodiment of FIGURE 2 has the special advantages that it conserves power and more efficiently removes carbon dioxide. It conserves power because the feed is at relatively low pressure and the vast majority of the feed is returned through conduit 239 and never proceeds farther in the cycle. The minor proportion that proceeds to the right in FIGURE 2 from the first flash column and is greatly enriched in helium is compressed to a desirably high pressure; but of course the work required for this compression is very much less than if the entire feed were thus compressed to begin with. Great savings in power result from thus compressing only an enriched fraction of the feed.

Moreover, the carbon dioxide is much more completely removed in the second flash column, because the pressure in that column is correspondingly high. As a result, only a few parts per million of carbon dioxide proceed farther in the cycle than the second flash column, and this small amount is entirely soluble in the highest boiling liquid residue from the third flash column. The need for chemical cleanup of carbon dioxide as by adsorption is therefore removed.

From a consideration of the cycles of both of FIGURES 1 and 2, it will be seen that by the practice of the present invention, flash columns may be used throughout the cycle, thereby avoiding the initial expense and maintenance cost of fractionating columns. Each such flash column includes at least a phase separator and means for flashing the vapor from the separated liquid either by pressure reduction as in the case of the expansion valves or by heating as in the case of conduits 133 and 335, and a further phase separator for separating the flashed vapor and remaining liquid from each other by gravity.

By the use of flashing and gravity separation techniques according to the present invention, several new methods may be practiced. In the first place, the gaseous mixture may be partially liquefied to produce a first liquid and a first vapor which are then parted from each other. A second vapor is flashed from the first liquid and the first and second vapors are partially liquefied to produce a second liquid and a third vapor, the third vapor then being separated from the second liquid. This method is embodied in a number of different ways throughout the illustrated cycles. The method is illustrated for example in FIGURE 1 in that there occurs cooling in exchanger 83 followed by phase separation in drum 87 with separate withdrawal of the gravity separated liquid and vapor through conduits 93 and 103, respectively, whereby the first liquid and the first vapor are parted from each other. A second vapor may then be flashed from that first liquid by pressure reduction as through valve 95, and that second vapor compressed to about the pressure of the first vapor, as in the case of vapor withdrawn from drum 89 through conduit 159 and compressed in compressor stage 151 to the pressure of the vapor in conduit 103 with which it is combined at point 157. That first vapor and compressed second vapor may then be at least partly liquefied to produce a second liquid and a third vapor which are then parted from each other, as in the case of the first vapor in the conduit 103 and the compressed second vapor in conduit 155 being combined and partially liquefied in heat exchangers 109 and 111 with the resulting second liquid and third vapor parted from each other in drum 117 and withdrawn through conduits 121 and 119, respectively. It should be also noted that that first vapor in conduit 103 is enriched in helium and that the second vapor in conduit 159 contains less helium than the first vapor but that the third vapor in conduit 119 is richer in helium even than the first vapor in conduit 103. In this way, separation of a lowest boiling component such as helium in relatively high concentration in vapor phase is made possible. In the embodiment of FIGURE 2, this same method is practiced during the course of the movement of material from the first flash column 211 to the second flash column 271, in that liquid from a higher pressure drum of column 211 is reduced in pressure and the vapor thus flashed off is separated in a lower pressure drum and compressed in compressor stage 267 and fed with vapor from the higher pressure drum from column 211 into drum 273 of second flash column 271.

In speaking of the above and other streams of the invention as being "partially liquefied," it will of course be understood that it is immaterial whether only a portion of a stream of vapor is condensed, or whether a stream of vapor is partially or totally condensed and a portion of the condensate revaporized. Similarly, when speaking of "expanding" or "compressing" a stream of the invention to the pressure of another stream, it makes no difference that the stream may be expanded to a pressure lower than the other stream and then partially recompressed to the desired pressure, or that the stream may be compressed to a pressure higher than the pressure of the other stream and then partially expanded to the desired pressure; in either case, there is expansion or compression within the meaning of this invention.

This first aspect of the invention is also embodied in the illustrated cycles in that gaseous mixture is partially liquefied to produce a first liquid and a first vapor which are then treated as described above except that instead of the second vapor being compressed to about the pressure of the first vapor, the first vapor is expanded to about the pressure of the second vapor. This aspect of the invention is embodied at three different places in the cycle of FIGURE 1, once in connection with each flash column. In connection with first flash column 13, a partially liquefied gaseous mixture is introduced through conduit 45 into drum 25, where it is gravity separated into a first liquid and a first vapor, the first liquid leaving through conduit 49 and the first vapor through conduit 65. The second vapor is flashed from the first liquid through valve 51, this second vapor being separated from the residual liquid in drum 27 and withdrawn through conduit 67. The first vapor, which was withdrawn through conduit 65, is expanded to about the pressure of the vapor in conduit 67 through valve 81, and the expanded first vapor and the second vapor are liquefied in exchanger 83 to produce a second liquid and a third vapor which are then parted from each other in drum 87 and withdrawn through conduits 93 and 103, respectively. As before, the first, second and third vapors are respectively richer, poorer and richest in the lowest boiling component such as helium. In the case of second flash column 85 of FIGURE 1, this aspect of the invention is practiced by introducing the partially liquefied gaseous mixture through conduit 93 into drum 89, in which it is separated into a first liquid leaving through conduit 97 and a first vapor leaving through conduit 159, the second vapor being produced by flashing through valve 99 and being withdrawn through conduit 163, the first vapor being expanded through valve 161 and the expanded first vapor and the second vapor in conduit 163 being partially liquefied in exchangers 109 and 111 and the resultant third vapor and second liquid being parted from each other in drum 117 and withdrawn through conduits 119 and 121, respectively. In the case of third flash column 115, the partially liquefied gaseous mixture is introduced into drum 125, the first liquid and first vapor being withdrawn through conduits 127 and 141, respectively, and the second vapor produced by flashing through valve 129 being withdrawn through conduit 145. The first vapor is expanded through valve 143 to the pressure of the second vapor in conduit 145, and the expanded first vapor and the second vapor are partially liquefied in exchangers 109 and 111 to produce a second liquid and a third vapor which are parted from each other in drum 117 and withdrawn through conduits 121 and 119, respectively. This aspect of the invention is also embodied three times in the cycle of FIGURE 2, in that in the case of first flash column 211, said first, second and third vapors emerge from drums 219, 221 and 273, respectively; and in the case of second flash column 251, said first, second and third vapors emerge from drums 277, 279 and 273, respectively; and in the case of third flash column 317, said first, second and third vapors emerge from drums 321, 323 and 319, respectively.

A further novel method aspect of the present invention is like the first novel aspect recited above, in which the second vapor is compressed to the pressure of the first vapor, but also includes treatment of the second liquid parted from the third vapor, by flashing a fourth vapor from that second liquid by pressure reduction and compressing the fourth vapor and partially liquefying the compressed fourth vapor to produce another portion of the second liquid with the residual vapor of the last-named liquefaction comprising a portion of the third vapor. Partial liquefaction of the first and second vapors thus produces only a portion of the second liquid and a portion of the third vapor. Preferably, the second and fourth vapors are compressed to about the pressure of and combined with the first vapor prior to the partial liquefaction of the first vapor. The first liquid is represented in the embodiment illustrated in FIGURE 1 by the liquid in conduit 93, the first vapor by the vapor in conduit 103, the second vapor by the vapor in conduit 159, the second liquid by the liquid in conduit 121, the third vapor by the vapor in conduit 119, and the fourth vapor by the vapor in conduit 141. The fourth vapor contains less helium or other lowest boiling component than does the third vapor, but the treatment of the fourth vapor by this method assures the presence of a greater quantity of helium or other such low boiling component in the third vapor than if the fourth vapor were not so treated, although the percentage of low boiling component in the third vapor is reduced by dilution with the fourth vapor. Thus, the first vapor is richer in lowest boiling component than the second vapor, while the third vapor is richer not only than the fourth vapor but also than the first vapor. This aspect of the invention is also to be found in the embodiment of FIGURE 2, in which said first, second, third and fourth vapors emerge from drums 213, 215, 273 and 275, respectively.

In still another novel aspect of the method of the present invention, gaseous mixture is partially liquefied to produce a first liquid and a first vapor which are parted from each other, and a second vapor is flashed from the first liquid. The first and second vapors are then partially liquefied to produce a second liquid and a third vapor, which are parted from each other, and the third vapor is partially liquefied to produce a third liquid and a fourth vapor, which are then parted from each other. This aspect of the invention is embodied in the cycle of FIGURE 1 by any two adjacent drums of first flash column 13, in the higher pressure drum of which the partially liquefied gaseous mixture is separted to produce a first liquid and a first vapor. Taking for example the drums 15 and 17, the first liquid is in conduit 29 and the first vapor is in conduit 55. The second vapor is flashed off in valve 31 and leaves through conduit 57. The first and second vapors in conduits 55 and 57 are partially liquefied in heat exchanger 83 and the second liquid and third vapor are parted from each other in drum 87. The third vapor in conduit 103 is partially liquefied in exchangers 109 and 111, and the resultant third liquid and fourth vapor are parted from each other in drum 117 and leave through conduits 121 and 119, respectively. The first vapor is richer in lowest boiling component than the second vapor, while the third vapor is richer than the first vapor, and the fourth vapor is richest of all. This aspect of the invention is embodied in the same way in FIGURE 2 starting with any two adjacent drums of first flash column 211 and proceeding in the same way as in FIGURE 1 through the second and third flash columns 271 and 317. In addition, this aspect of the invention is further embodied in FIGURE 2 starting with any two adjacent drums of second flash column 271 other than the highest pressure drum 273, and proceeding from those two drums through the recycle compression in stages 267 and 245 back to drum 273 and thence to third flash column 317.

A still further novel method aspect of the present invention is like the aspect last described above, but includes in addition treatment of the second liquid by flashing off a fourth vapor therefrom, after which the third and fourth vapors are partially liquefied and used to produce a third liquid and a fifth vapor. In this last instance, the first vapor is enriched in lowest boiling component such as helium, while the second vapor contains proportionately less than the first vapor. The third vapor contains proportionately more lowest boiling component than the first, while the fourth contains proportionately less than the third; and the fifth is richest of all in lowest boiling component. This aspect of the invention is found in the embodiment of FIGURE 1, in that a fourth vapor is flashed off the second liquid in valve 95 and this vapor passes through conduit 159 and ultimately into drum 117, the overhead from which is withdrawn as said fifth vapor through conduit 119, said third liquid being withdrawn from drum 117 through conduit 121.

Finally, another novel aspect of the method of the present invention comprises partially liquefying the gaseous mixture to produce, at a first pressure, a first vapor and a first liquid which are parted from each other, the first vapor being compressed from that original pressure to a higher second pressure, the first liquid being reduced in pressure from its original presure to a lower third pressure thereby to flash off a second vapor, the second vapor then being compressed to about that second pressure, and the compressed first and second vapors being partially liquefied to produce a second liquid and a third vapor which are parted from each other. This last aspect of the invention is embodied for example in FIGURE 2, in which the partially liquefied gaseous mixture is separated into a first vapor and a first liquid in drum 213, the first vapor withdrawn from drum 213 being compressed in stage 245, and the liquid withdrawn from drum 213 being expanded through valve 231 and the resultant second vapor being withdrawn through conduit 251, compressed from a pressure lower than the pressure in drum 213 to a pressure higher than that in drum 213 in compressor stages 267 and 245, and the compressed first and second vapors being then partially liquefied and fed to and separated in drum 273 into a second liquid and a third vapor.

The novel apparatus of the present invention is characterized by at least a pair of flash columns such that vapor from a lower pressure stage of a first flash column is cooled and partially liquefied and introduced into a higher pressure stage of a second flash column, as in the case of columns 13 and 85, or 85 and 115 of FIGURE 1, or as in the case of columns 211 and 271 of FIGURE 2. Of course, a single column with low pressure recycle, such as column 115 or 271 or 317, does not satisfy this requirement for two columns because the high pressure vapor from a single column is leaner in lowest boiling component than is the high pressure overhead from the second of two columns.

The invention also includes a method and apparatus for recovering a maximum of the desired lower boiling component, characterized in that gaseous mixture is partially liquefied to produce a first liquid and a first vapor that are parted from each other, after which a vapor is flashed from the resulting and remaining liquids in at least three stages with separation of the resulting vapor from the remaining liquid in each stage thereby greatly to reduce or even eliminate the desired low boiling component that would otherwise be lost in the liquid separated in the last stage.

From a consideration of the foregoing disclosure, it will be obvious that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A method of separating components of gaseous mixtures, comprising the steps of
    cooling a gaseous mixture to a first relatively low temperature and partially liquefying the gaseous mixture to produce a first liquid portion and a first vapor portion,
    passing partially liquefied gaseous mixture to a first separation zone,
    withdrawing from the first separation zone a first liquid of a composition substantially corresponding to the composition of the first liquid portion and a first vapor of a composition substantially corresponding to the composition of the first vapor portion,
    flashing a second vapor from said first liquid,
    cooling said first vapor and said second vapor to a second temperature lower than said first temperature and partially liquefying said first vapor and said second vapor to produce a second liquid portion and a third vapor portion,
    passing partially liquefied first vapor and second vapor to a second separation zone,
    and withdrawing from the second separation zone a third vapor of a composition substantially corresponding to the composition of the third vapor portion.

2. A method of separating a fraction enriched helium from a gaseous mixture containing helium, comprising the steps of cooling a gaseous mixture containing helium to a first relatively low temperature and partially liquefying the gaseous mixture containing helium to produce a first liquid portion and a first vapor portion enriched in helium,
passing partially liquefied gaseous mixture to a first separation zone,
withdrawing from the first separation zone a first vapor of a composition substantially corresponding to the composition of said first vapor portion and a first liquid of a composition substantially corresponding to the composition of said first liquid portion,
flashing from said first liquid a second vapor containing less helium than said first vapor,
cooling said first vapor and said second vapor to a second temperature lower than said first temperature and partially liquefying said first vapor and said second vapor to produce a second liquid portion and a third vapor portion richer in helium than said first vapor,
passing partially liquefied first vapor and second vapor to a second separation zone,
and withdrawing from the second separation zone a third vapor of a composition substantially corresponding to the composition of said third vapor portion.

3. A method of separating components of gaseous mixtures, comprising the steps of
cooling a gaseous mixture to a first relatively low temperature and partially liquefying the gaseous mixture to produce a first liquid portion and a first vapor portion,
passing partially liquefied gaseous mixture to a first separation zone,
withdrawing from the first separation zone a first vapor of a composition substantially corresponding to the composition of said first vapor portion and a first liquid of a composition substantially corresponding to the composition of said first liquid portion,
reducing the pressure of said first liquid to flash a second vapor from said first liquid,
compressing said second vapor to about the pressure of said first vapor,
cooling said first vapor and said compressed second vapor to a second temperature lower than said first temperature and partially liquefying said first vapor and said compressed second vapor to produce a second liquid portion and a third vapor portion,
passing partially liquefied first vapor and compressed second vapor to a second separation zone,
and withdrawing from the second separation zone a third vapor of a composition substantially corresponding to the composition of said third vapor portion.

4. A method of separating a fraction rich in helium from a gaseous mixture containing helium, comprising the steps of
cooling a gaseous mixture containing helium to a first relatively low temperature and partially liquefying the gaseous mixture containing helium to produce a first liquid portion and a first vapor portion enriched in helium,
passing partially liquefied gaseous mixture to a first separation zone,
withdrawing from the first separation zone a first vapor of a composition substantially corresponding to the composition of said first vapor portion and a first liquid of a composition substantially corresponding to the composition of said first liquid portion,
reducing the pressure of said first liquid to flash from said first liquid a second vapor containing less helium than said first vapor,
compressing said second vapor to about the pressure of said first vapor,
cooling said first vapor and said compressed second vapor to a second temperature lower than said first temperature and partially liquefying said first vapor and said compressed second vapor to produce a second liquid portion and a third vapor portion richer in helium than said first vapor,
passing partially liquefied first vapor and compressed second vapor to a second separation zone,
and withdrawing from the second separation zone a third vapor of a composition substantially corresponding to the composition of said third vapor portion.

5. A method of separating components of gaseous mixtures, comprising the steps of
partially liquefying a gaseous mixture to produce a first liquid portion and a first vapor portion,
passing partially liquefied gaseous mixture to a first separation zone,
withdrawing from the first separation zone a first vapor of a composition substantially corresponding to the composition of said first vapor portion and a first liquid of a composition substantially corresponding to the composition of said first liquid portion,
reducing the pressure of said first liquid to flash a second vapor from said first liquid,
expanding said first vapor to about the pressure of said second vapor,
partially liquefying said expanded first vapor and said second vapor to produce a second liquid portion and a third vapor portion,
passing partially liquefied expanded first vapor and said second vapor to a second separation zone,
and withdrawing from the second separation zone a third vapor of a composition substantially corresponding to the composition of said third vapor portion.

6. A method of separating a fraction rich in helium from a gaseous mixture containing helium, comprising the steps of
partially liquefying a gaseous mixture containing helium to produce a first liquid portion and a first vapor portion enriched in helium,
passing partially liquefied gaseous mixture to a first separation zone,
withdrawing from the first separation zone a first vapor of a composition substantially corresponding to the composition of said first vapor portion and a first liquid of a composition substantially corresponding to the composition of said first liquid portion,
reducing the pressure of said first liquid to flash from said first liquid a second vapor containing less helium than said first vapor,
expanding said first vapor to about the pressure of said second vapor,
partially liquefying said expanded first vapor and said second vapor to produce a second liquid portion and a third vapor portion richer in helium than said first vapor,
passing partially liquefied expanded first vapor and said second vapor to a second separation zone,
and withdrawing from the second separation zone a third vapor of a composition substantially corresponding to the composition of said third vapor portion.

7. A method of separating components of gaseous mixtures, comprising the steps of
partially liquefying a gaseous mixture to produce a first liquid portion and a first vapor portion,
passing partially liquefied gaseous mixture to a first separation zone,
withdrawing from the first separation zone a first vapor of a composition substantially corresponding to the composition of said first vapor portion and a first liquid of a composition substantially corresponding to the composition of said first liquid portion,
reducing the pressure of said first liquid to flash a second vapor from said first liquid, partially liquefying said first vapor to produce a second liquid portion and a third vapor portion, passing partially liquefied first vapor to a second separation zone, withdrawing from the second separation zone a third vapor of a composition substantially corresponding to the composition of said third vapor portion and a second liquid of a composition substantially corresponding to the composition of said second liquid portion, reducing the pressure of said second liquid to flash a fourth vapor from said second liquid, compressing said second vapor and said fourth vapor to about the pressure of said first vapor, partially liquefying said compressed second vapor and said compressed fourth vapor to produce a third liquid portion and a fifth vapor portion, utilizing said third liquid portion to provide a part of said second liquid, and utilizing said fifth vapor portion to provide a part of said third vapor.

8. A method of separating a gaseous fraction rich in helium from a gaseous mixture containing helium, comprising the steps of partially liquefying a gaseous mixture containing helium to produce a first liquid portion and a first vapor portion enriched in helium, passing partially liquefied gaseous mixture to a first separation zone, withdrawing from the first separation zone a first vapor of a composition substantially corresponding to the composition of said first vapor portion and a first liquid of a composition substantially corresponding to the composition of said first liquid portion, reducing the pressure of said first liquid to flash from said first liquid a second vapor containing less helium than said first vapor, partially liquefying said first vapor to produce a second liquid portion and a third vapor portion richer in helium than said first vapor, passing partially liquefied first vapor to a second separation zone, withdrawing from the second separation zone a third vapor of a composition substantially corresponding to the composition of said third vapor portion and a second liquid of a composition substantially corresponding to the composition of said second liquid portion, reducing the pressure of said second liquid to flash from said second liquid a fourth vapor containing less helium than said third vapor, compressing said second vapor and said fourth vapor to about the pressure of said first vapor, partially liquefying said compressed second vapor and said compressed fourth vapor to produce a third liquid portion and a fifth vapor portion, utilizing said third liquid portion to provide a part of said second liquid, and utilizing said fifth vapor portion to provide a part of said third vapor.

9. A method of separating components of gaseous mixtures, comprising the steps of cooling a gaseous mixture to a first relatively low temperature and partially liquefying the gaseous mixture to produce a first liquid portion and a first vapor portion, passing partially liquefied gaseous mixture to a first separation zone, withdrawing from the first separation zone a first vapor of a composition substantially corresponding to the composition of said first vapor portion and a first liquid of a composition substantially corresponding to the composition of said first liquid portion, flashing a second vapor from said first liquid, cooling said first vapor and said second vapor to a second temperature lower than said first temperature and partially liquefying said first vapor and said second vapor to produce a second liquid portion and a third vapor portion, passing partially liquefied first vapor and second vapor to a second separation zone, withdrawing from said second separation zone a third vapor of a composition substantially corresponding to said third vapor portion, partially liquefying said third vapor to produce a third liquid portion and a fourth vapor portion, passing partially liquefied third vapor to a third separation zone, and withdrawing from said third separation zone a third liquid of a composition substantially corresponding to the composition of said third liquid portion and a fourth vapor of a composition substantially corresponding to the composition of said fourth vapor portion.

10. A method of separating a fraction rich in helium from a gaseous mixture containing helium, comprising the steps of cooling a gaseous mixture containing helium to a first relatively low temperature and partially liquefying the gaseous mixture containing helium to produce a first liquid portion and a first vapor portion enriched in helium, passing partially liquefied gaseous mixture to a first separation zone, withdrawing from the first separation zone a first vapor of a composition substantially corresponding to the composition of said first vapor portion and a first liquid of a composition substantially corresponding to the composition of said first liquid portion, flashing from said first liquid a second vapor containing less helium than said first vapor, cooling said first vapor and said second vapor to a second temperature lower than said first temperature and partially liquefying said first vapor and said second vapor to produce a second liquid portion and a third liquid portion richer in helium than said first vapor, passing partially liquefied first vapor and second vapor to a second separation zone, withdrawing from said second separation zone a third vapor of a composition substantially corresponding to the composition of said third vapor portion and a second liquid of a composition substantially corresponding to the composition of said second liquid portion, partially liquefying said third vapor to produce a third portion and a fourth vapor portion richer in helium than said third vapor, passing partially liquefied third vapor to a third separation zone, and withdrawing from said third separation zone a fourth vapor of a composition substantially corresponding to the composition of said fourth vapor portion and a third liquid of a composition substantially corresponding to the composition of said third liquid portion.

11. A method of separating components of gaseous mixtures, comprising the steps of partially liquefying a gaseous mixture to produce a first liquid portion and a first vapor portion, passing partially liquefied gaseous mixture to a first separation zone, withdrawing from the first separation zone a first vapor of a composition substantially corresponding to the composition of said first vapor portion and a first liquid of a composition substantially corresponding to the composition of said first liquid portion, flashing a second vapor from said first liquid, partially liquefying said first vapor and said second vapor to produce a second liquid portion and a third vapor portion, passing partially liquefied first vapor and second vapor to a second separation zone, withdrawing from said second separation zone a third vapor of a composition substantially corresponding to the composition of said third vapor portion and a second liquid for a composition substantially corresponding to the composition of said second liquid portion, flashing a fourth vapor from said second liquid, partially liquefying said third vapor and said fourth vapor to produce a third liquid portion and a fifth vapor portion, passing partially liquefied third vapor and fourth vapor to a third separation zone, and withdrawing from said third separation zone a fifth vapor of a composition substantially corresponding to said fifth vapor portion and a third liquid of a composition substantially corresponding to said third liquid portion.

12. A method of separating a fraction rich in helium from a gaseous mixture containing helium, comprising the steps of partially liquefying a gaseous mixture containing helium to produce a first liquid portion and a first vapor portion enriched in helium, passing partially liquefied gaseous mixture to a first separation zone, withdrawing from the first separation zone a first vapor of a composition substantially corresponding to the composition of said first vapor portion and a first liquid of a composition substantially corresponding to the composition of said first liquid portion, flashing from said first liquid a second vapor containing less helium than said first vapor, partially liquefying said first vapor and said second vapor to produce a second liquid portion and a third vapor portion richer in helium than said first vapor, passing partially liquefied first vapor and second vapor to a second separation zone, withdrawing from said second separation zone a third vapor of a composition substantially corresponding to said third vapor portion and a second liquid of a composition substantially corresponding to said second liquid portion, flashing from said second liquid a fourth vapor containing less helium than said third vapor, partially liquefying said third vapor and said fourth vapor to produce a third liquid portion and a fifth vapor portion richer in helium than said third vapor, passing partially liquefied third vapor and fourth vapor to a third separation zone, and withdrawing from said third separation zone a fifth vapor of a composition correspondingly to said fifth vapor portion and a third liquid of a composition substantially corresponding to said third liquid portion.

13. A method of separating components of gaseous mixtures, comprising the steps of cooling a gaseous mixture to a first relatively low temperature and partially liquefying the gaseous mixture to produce a first liquid portion and a first vapor portion at a first pressure, passing partially liquefied gaseous mixture to a first separation zone, withdrawing from the first separation zone a first vapor of a composition substantially corresponding to the composition of said first vapor portion and a first liquid of a composition substantially corresponding to the composition of said first liquid portion, compressing said first vapor to a second pressure above said first pressure, reducing the pressure of said first liquid to a third pressure below said first pressure to flash a second vapor from said first liquid, compressing said second vapor to about said second pressure, cooling said compressed first vapor and said compressed second vapor to a second temperature lower than said first temperature and partially liquefying said compressed first vapor and said compressed second vapor to produce a second liquid portion and a third vapor portion, passing partially liquefied compressed first vapor and compressed second vapor to a second separation zone, and withdrawing from said second separation zone a third vapor of a composition substantially corresponding to said third vapor portion and a second liquid of a composition substantially corresponding to the composition of said second liquid portion 14. A method of separating a fraction rich in helium from a gaseous mixture containing helium, comprising the steps of cooling a gaseous mixture containing helium to a first relatively low temperature and partially liquefying the gaseous mixture containing helium to produce a first liquid portion and a first vapor portion enriched in helium at a first pressure, passing partially liquefied gaseous mixture to a first separation zone, withdrawing from the first separation zone a first vapor of a composition substantially corresponding to the composition of said first vapor portion and a first liquid of a composition substantially corresponding to the composition of said first liquid portion, compressing said first vapor to a second pressure higher than said first pressure, reducing the pressure of said first liquid to a third pressure below said first pressure to flash from said first liquid a second vapor containing less helium than said first vapor, compressing said second vapor to about said second pressure, cooling said compressed first vapor and said compressed second vapor to a second temperature lower than said first temperature and partially liquefying said compressed first vapor and said compressed second vapor to produce a second liquid portion and a third vapor portion richer in helium than said first vapor, passing partially liquefied compressed first vapor and compressed second vapor to a second separation zone, and withdrawing from said second separation zone a third vapor of a composition substantially corresponding to said third vapor portion and a second liquid of a composition substantially corresponding to the composition of said second liquid portion.

15. A method of separating components of gaseous mixtures, comprising the steps of cooling a gaseous mixture to a first relatively low temperature and partially liquefying the gaseous mixture to produce a first liquid portion and a first vapor portion, passing partially liquefied gaseous mixture to a first separation zone, withdrawing from the first separation zone a first vapor of a composition substantially corresponding to said first vapor portion and a first liquid of a composition substantially corresponding to the composition of said first liquid portion, flashing said first liquid to produce a second vapor portion and a second liquid portion, passing flashed first liquid to a second separation zone, withdrawing from said second separation zone a second vapor of a composition substantially corresponding to the composition of said second vapor portion and a second liquid of a composition substantially corresponding to the composition of said second liquid portion, flashing said second liquid to provide a third vapor portion and a third liquid portion, passing flashed second liquid to a third separation zone, withdrawing from said third separation zone a third vapor of a composition substantially corresponding to the composition of said third vapor portion and a third liquid of a composition substantially corresponding to the composition of said third liquid portion, cooling said first vapor, said second vapor and said third vapor to a second temperature lower than said first temperature and partially liquefying said first vapor, said second vapor and said third vapor to produce a fourth vapor portion and a fourth liquid portion, passing partially liquefied first vapor, second vapor and third vapor to a fourth separation zone, and withdrawing from said fourth separation zone a fourth vapor of a composition substantially corresponding to the composition of said fourth vapor portion.

16. Apparatus for separating components of gaseous mixtures, comprising two flash columns, each flash column including at least an upstream phase separator for separating a vapor-liquid mixture into a vapor and a liquid and means for flashing a vapor from the separated liquid and a downstream phase separator for separating the flashed vapor and the remaining liquid from each other by gravity, each phase separator of each flash column being devoid of means for effecting a substantial change in composition of the vapor and of the liquid separated thereby means for partially liquefying gaseous mixture and for introducing the partially liquefied gaseous mixture into an upstream phase separator of the first flash column, means for withdrawing overhead vapor from a downstream phase separator of the first flash column and for partially liquefying the latter vapor and for introducing the partially liquefied latter vapor into an upstream phase separator of the second flash column, means for withdrawing a vapor from an upstream phase separator of the second flash column, means for withdrawing overhead vapor from a downstream phase separator of the second flash column and for partially liquefying the latter vapor and for recycling partly liquefied latter vapor to an upstream phase separator of the second flash column.

17. Apparatus as claimed in claim 16, and a further phase separator in fluid circuit between said downstream phase separator of said first flash column and said upstream phase separator of said second flash column for receiving partially liquefied overhead from said downstream phase separator of said first flash column, and means for withdrawing overhead from said further phase separator and for partially liquefying the latter vapor and introducing partially liquefied latter vapor into said upstream phase separator of said second flash column.

18. Apparatus as claimed in claim 16, said means for partially liquefying gaseous mixture and for introducing the partially liquefied gaseous mixture into an upstream phase separator of the first flash column comprising a further flash column from which vapor is withdrawn from a downstream phase separator and fed to said first flash column.

19. Apparatus as claimed in claim 16, and a further flash column downstream of said second flash column and means for partially liquefying and feeding into an upstream phase separator of said further flash column vapor withdrawn from an upstream phase separator of said second flash column, and means for withdrawing vapor from a downstream phase separator of said further flash column and for partially liquefying said latter vapor and for recycling partly liquefied latter vapor to an upstream phase separator of said further flash column.

20. Apparatus for separating components of gaseous mixtures, comprising two flash columns, each flash column including at least an upstream phase separator for separating a vapor-liquid mixture into a vapor and a liquid and means for flashing a vapor from the separated liquid and a downstream phase separator for separating the flashed vapor and the remaining liquid from each other by gravity, each phase separator of each flash column being devoid of means for effecting a substantial change in composition of the vapor and of the liquid separated thereby, means for partially liquefying gaseous mixture and for introducing the partially liquefied gaseous mixture into an upstream phase separator of the first flash column, means for withdrawing overhead vapor from a downstream phase separator of the first flash column and for partially liquefying the latter vapor and for introducing the partially liquefied latter vapor into an upstream phase separator of the second flash column, means for withdrawing overhead vapor from a downstream phase separator of the second flash column and for partially liquefying the latter vapor, a further phase separator, and means for introducing the partially liquefied latter vapor into said further phase separator, and means for withdrawing a vapor from the latter phase separator.

References Cited by the Examiner

UNITED STATES PATENTS

| | | | |
|---|---|---|---|
| 1,664,412 | 4/1928 | Haynes. | |
| 2,012,080 | 8/1935 | De Baufre | 62—24 |
| 2,652,129 | 9/1953 | Benedict. | |
| 2,663,169 | 12/1953 | Twomey | 62—28 |
| 2,973,834 | 3/1961 | Cicalese. | |
| 2,996,891 | 8/1961 | Tung. | |
| 3,062,016 | 1/1962 | Dennis. | |
| 3,091,094 | 5/1963 | Becker | 62—23 |
| 3,160,489 | 12/1964 | Brocoff | 62—26 X |

FOREIGN PATENTS 856,683   12/1960   Great Britain.

NORMAN YUDKOFF, *Primary Examiner.*